(12) United States Patent
Axelsson (10) Patent No.: US 8,213,732 B2
(45) Date of Patent: Jul. 3, 2012

(54) DEVICE AND METHOD FOR SIMPLIFYING VECTOR GRAPHICS

(75) Inventor: Henric Axelsson, Sundsvall (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 768 days.

(21) Appl. No.: 12/307,891

(22) PCT Filed: Jul. 7, 2006

(86) PCT No.: PCT/SE2006/050251
§ 371 (c)(1),
(2), (4) Date: Mar. 27, 2009

(87) PCT Pub. No.: WO2008/004927
PCT Pub. Date: Jan. 10, 2008

(65) Prior Publication Data
US 2009/0317011 A1    Dec. 24, 2009

(51) Int. Cl.
*G06K 9/36* (2006.01)
*G06K 9/48* (2006.01)
*G06T 15/40* (2011.01)

(52) U.S. Cl. ...................................... 382/241; 345/421

(58) Field of Classification Search .................. None
See application file for complete search history.

(56) References Cited

U.S. PATENT DOCUMENTS

| | | | | |
|---|---|---|---|---|
| 4,847,789 A * | 7/1989 | Kelly et al. | .................. | 345/421 |
| 5,115,479 A * | 5/1992 | Murayama | .................. | 382/241 |
| 2003/0001868 A1* | 1/2003 | Sack et al. | ..................... | 345/660 |
| 2005/0041022 A1* | 2/2005 | Blot et al. | ..................... | 345/421 |

OTHER PUBLICATIONS

Brian Price and William Barrett, "Object-based vectorization for interactive image editing", Visual comput 2006.*
Osamu Hori and Satohide Tanigawa, "Raster-to-vector conversion by line fitting based on contours and skeletons", IEEE, 1993.*

* cited by examiner

*Primary Examiner* — Li Liu (57) ABSTRACT

Today's computer programs that convert raster images into vector-based images do not optimize/compress the vector representation of the vector-based images. Instead, they simply keep all of the complex edges for the vector objects within the vector-based images. The present invention described herein functions to create a compressed vector-based image by simplifying the shapes of common complex edges which are shared by adjacent vector objects. The compression (lossless compression) of the vector objects is done without affecting the perceived quality of the vector-based image.

21 Claims, 7 Drawing Sheets

DEVICE AND METHOD FOR SIMPLIFYING VECTOR GRAPHICS

TECHNICAL FIELD

The present invention relates to an image processing device and method that compresses a vector-based image by removing duplicate information and simplifying the shape(s) of complex edge(s) in vector object(s).

BACKGROUND

Electronic based images are commonly used today because they are easy to store, retrieve and manipulate when compared to paper based images. Plus, electronic based images are commonly used today because they are easy to distribute when compared to paper based images. With the advent of the Internet this last advantage is an important consideration. If desired, the paper based images can be converted into electronic based images to make them easier to manipulate and distribute. This conversion can be achieved by using a scanner which scans a paper based image and then creates an electronic based image. Of course, an electronic device such as a digital camera (for example) can be used to take a picture and then create an electronic based image. In either case, the electronic based image is created by first generating a raster (bitmap) image and then converting the raster image into a vector-based image (vector graphic image). The procedure used to convert the raster image into the vector-based image is known in the field as a vectorization process.

Figure 1A:
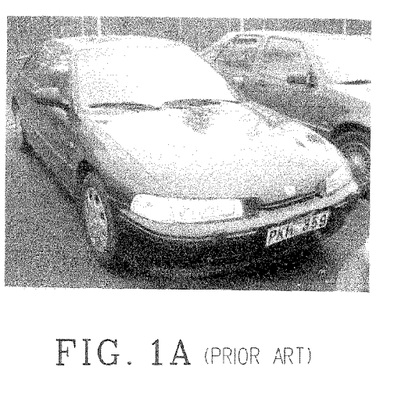
FIGS. 1A-1B (PRIOR ART) respectively illustrate a raster image and a vector-based image of two automobiles which are used to help explain a problem with the state-of-the-art vectorization programs which is addressed by the present invention.
Figure 1B:
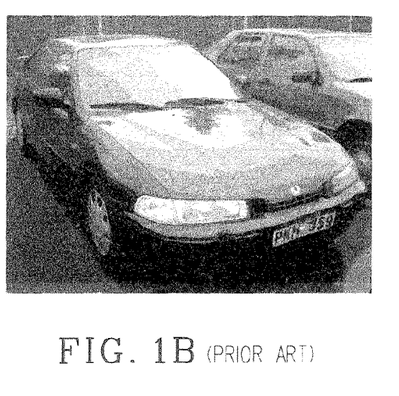

There are many types of vectorization programs available on the market today which can be used to convert a raster image into a vector-based image. Some of the more well-known vectorization programs include (for example): Vector Eye, Adobe Streamline, Silhouette, Synthetik Studio Artist and Macromedia Freehand. How these vectorization programs perform and what parameters they use such as numbers of colors, numbers of shapes, complexity of shapes, etc. . . . , varies greatly and depends on the desired result. However, all of these vectorization programs function to analyze color information within the raster image and then create several larger areas known as vector objects which share the same colors. FIGS. 1A-1B (PRIOR ART) are provided to respectively illustrate a raster image and a vector-based image of two automobiles (the vector-based image will be discussed in detail below with respect to the present invention). These vectorization programs all work well to create a suitable vector-based image but they could be improved to better compress the representation of the vector-based image. This need and other needs are satisfied by the image processing device and method of present invention.

SUMMARY

Today's computer programs that convert raster images into vector-based images do not optimize/compress the vector representation of the vector-based images. Instead, they simply keep all of the complex edges for the vector objects within the vector-based images. The present invention described herein functions to create a compressed vector-based image by simplifying the shapes of common complex edges which are shared by adjacent vector objects. The compression (lossless compression) of the vector objects is done without affecting the perceived quality of the vector-based image.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 2:
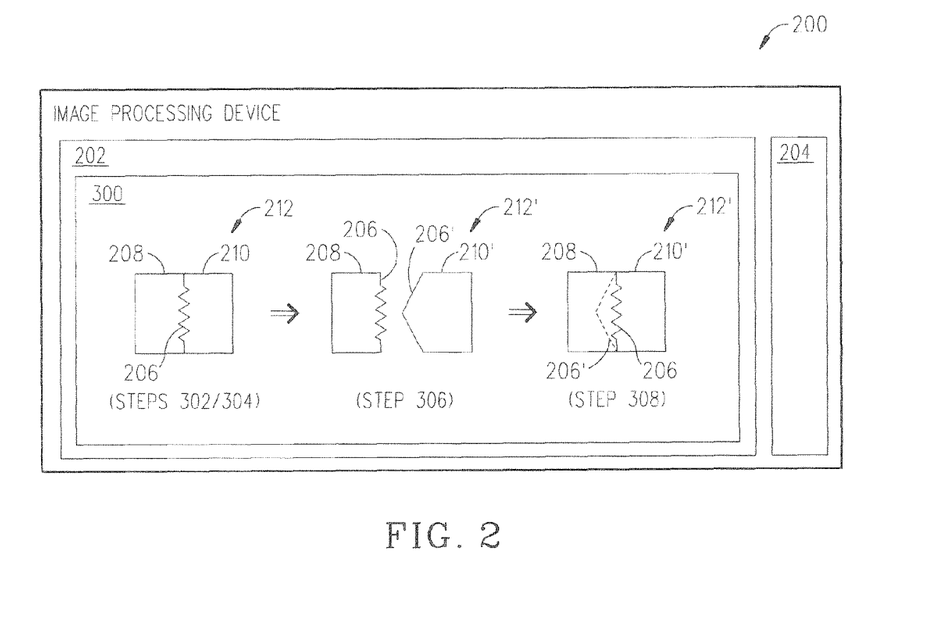
FIG. 2 is a block diagram illustrating the basic components of an image processing device which compresses a vector-based image in accordance with the present invention.
Figure 3:
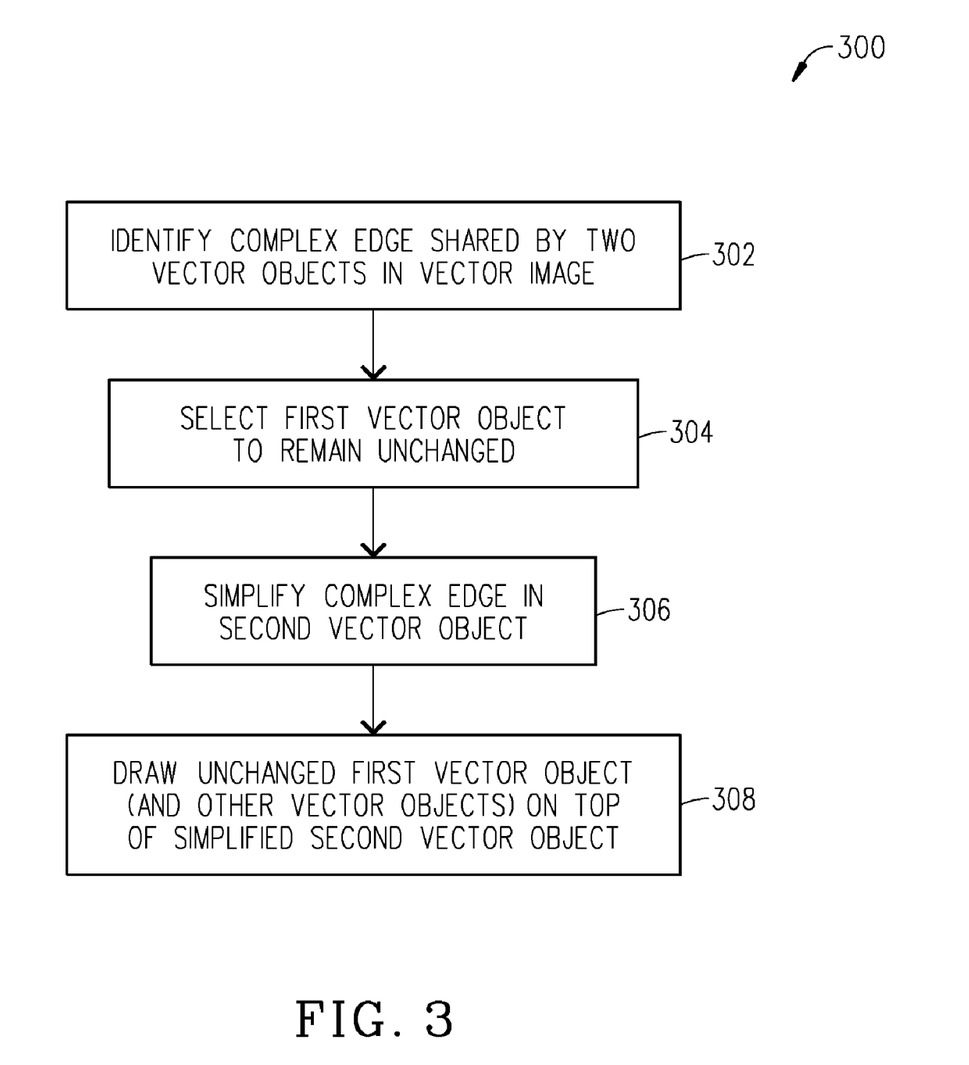
FIG. 3 is a flowchart illustrating the basic steps of a method for compressing a vector-based image in accordance with the present invention.

Referring to FIG. 2, there is illustrated a block diagram of an image processing device 200 which implements a preferred method 300 so it can compress a vector-based image in accordance with the present invention. The image processing device 200 includes a processor 202 which processes instructions stored within a memory 204 to compress a vector-based image 212 (for example) as follows: (1) identify a complex edge 206 that is shared by two adjacent non-transparent vector objects 208 and 210 which are part of the vector-based image 212 (step 302 in FIG. 3); (2) select one vector object 208 (for example) which is going to have an unchanged complex edge 206 when it is used later to form a compressed vector-based image 212' (step 304 in FIG. 3); (3) simplify the complex edge 206 of the other vector object 210 (for example) (where the unchanged vector object 208 and the simplified vector object 210' are shown separated) (step 306 in FIG. 3); and (4) draw the unchanged vector object 208 (and possibly other vector objects) on top of at least a portion of the simplified edge 206' of the simplified vector object 210' to form the compressed vector-based image 212' (step 308 in FIG. 3). How this method 300 can compress a vector-based image is described in more detail below where it is used to compress four different vector-based images.

Figure 4A:
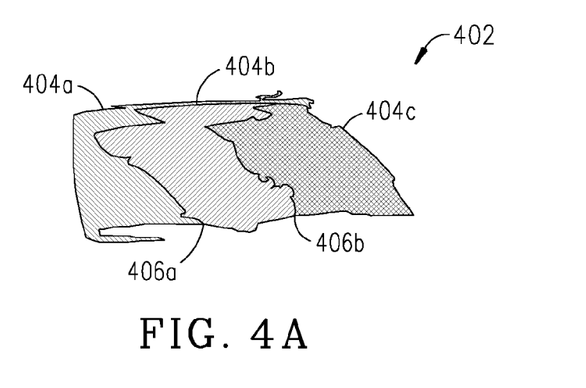
FIGS. 4A-4D is a set of drawings which are used to help explain how a first vector-based image can be compressed by the method shown in FIG. 3 in accordance with the present invention.
Figure 4B:
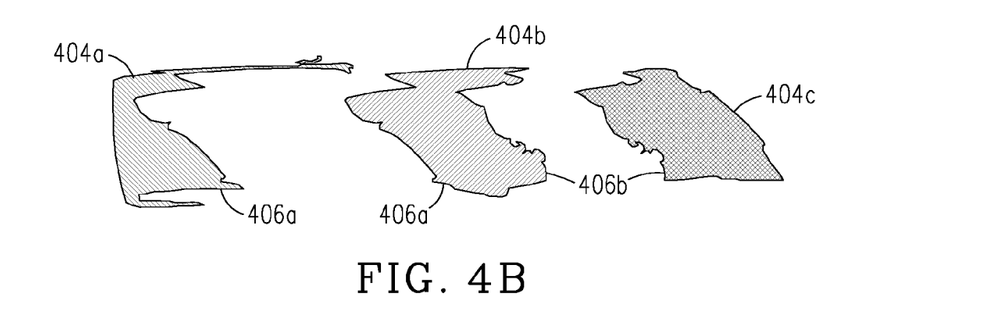

In example #1, the method 300 compresses the vector-based image of a windshield located within the automobile shown on the left side in FIG. 1B. The vector-based image of the windshield 402 is shown in FIG. 4A (note: the vector-based image is shown darker than normal to better help describe the present invention). The three vector objects 404a, 404b and 404c which make-up the vector-based image of the windshield 402 are shown separated from one another in FIG. 4B. In this example, the method 300 compresses the windshield image 402 by simplifying two complex edges 406a and 406b where the first complex edge 406a is shared between vector objects 404a and 404b and the second complex edge 406b is shared between vector objects 404b and 404c.

Figure 4C:
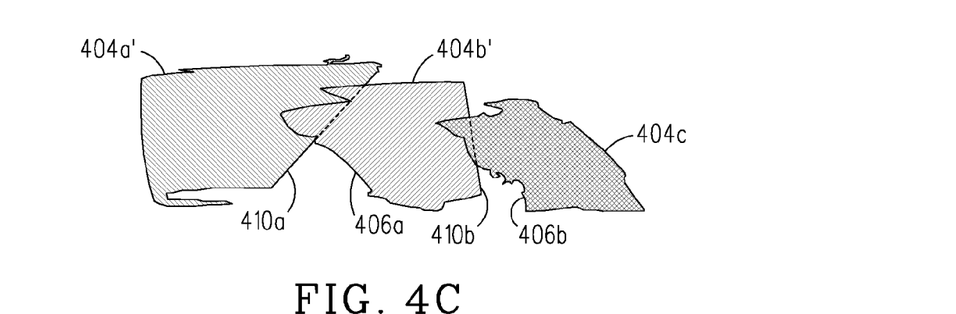

In particular, the method 300 simplifies the first complex edge 406a by performing the following steps: (1) identifying the complex edge 406a which is shared by two adjacent vector objects 404a and 404b (step 302); (2) randomly selecting (or intelligently/iteratively selecting) one of the vector objects 404a and 404b (e.g., vector object 404b) to remain unchanged so it can be used later as is to form the compressed vector-based image 402' (in this example however the vector object 404b will be subsequently changed as discussed below when another shared complex edge 406b is simplified) (step 304); and (3) simplifying the first complex edge 406a associated with vector object 404a by replacing the shape of the complex edge 406a with a simpler shape 410a which in this case is a straight line but any arbitrary shape can be used so long that it is a simpler shape than the original complex edge 406a (see FIG. 4C) (step 306). The method 300 repeats these steps to simplify the second complex edge 406b (associated with vector object 404b) by replacing it with a simpler shape 410b which in this case is a straight line but again any arbitrary shape can be used so long that it is a simpler shape than the original complex edge 406b (see FIG. 4C).

The method 300 then draws the unchanged vector object 404c (with the original complex edge 406b) on top of the changed vector object 404b' (with the original complex edge 406a and the simplified edge 410b) which was drawn on top of the changed vector object 404a' (with the simplified edge 410a) to form the compressed vector-image of the windshield 402' (see FIG. 4D) (step 308). As can be seen, there are no gaps between the vector objects 404a', 404b' and 404c which means that the simplified edge 410a of the changed vector object 404a' was formed so it will be completely hidden underneath the changed vector object 404b' and the unchanged vector object 404c. Plus, the simplified edge 410b of the changed vector object 404b' was formed so it will be completely hidden underneath the unchanged vector object 402c. To draw the compressed vector-image of the windshield 402, the method 300 could use a depth buffer or more specific a vector-graphic description language which uses a depth buffer so it can describe what vector object is to be drawn on top of another vector object. One such language is SVG (Scalable Vector Graphics standardized by W3C) which is an XML-based language that renders vector objects in the same order as they appear in the file.

Figure 4D:
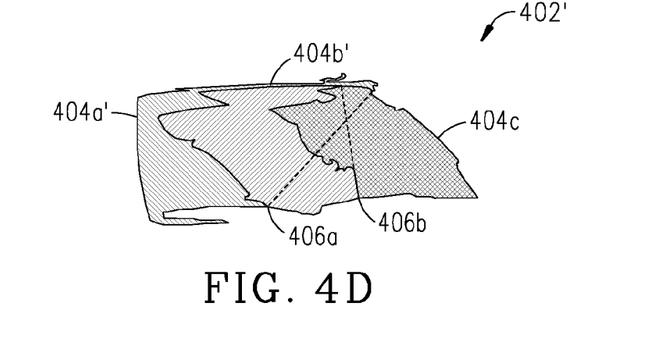

As can be seen, the original non-compressed vector-image of the windshield 402 shown in FIG. 4A looks the same as the compressed vector-image of windshield 402' shown in FIG. 4D. This indicates that the method 300 is indeed an improvement over the state-of-the-art vectorization programs because it reduces the amount of information needed to form the same visual representation of the windshield 402. Basically, the method 300 reduces the amount of information needed to describe vector objects 404a and 404b by replacing their shared complex edges 406a and 406b with simplified shared edges 410a and 410b. This process can be referred to as lossless compression or lossless optimization.

Figure 5A:
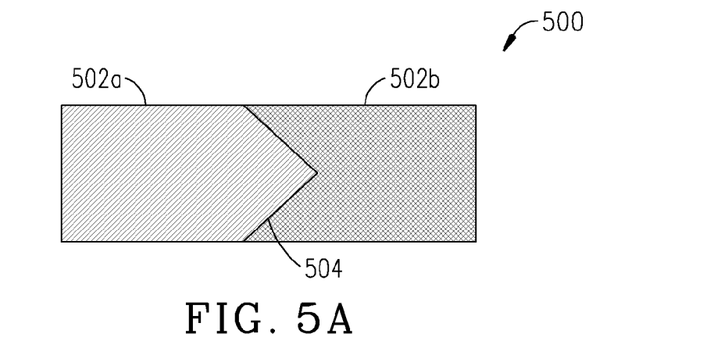
FIGS. 5A-5D is a set of drawings which are used to help explain how a second vector-based image can be compressed by the method shown in FIG. 3 in accordance with the present invention.

In example #2, the method 300 compresses a vector-based image 500 containing two vector objects 502a and 502b that are defined in accordance with the following SVG file:

```
<?xml version="1.0" encoding="utf-8"?>
<svg width="400" height="400">
<path fill="#00015F" d="M0, 0L100, 0L150, 50L100, 100L0, 100z"/>
<path fill="#FF0100" d="M200, 0L100, 0L150, 50L100, 100L200, 100z"/>
</svg>
```

Figure 5B:
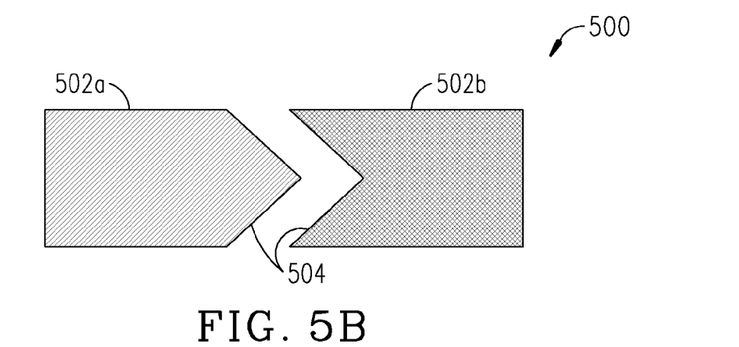

When drawn this SVG file creates the vector-based image 500 which is shown in FIG. 5A (where the top left corner is at coordinate x, y=0, 0 and the bottom right corner is at x, y=200,100). FIG. 5B shows the two vector objects 502a and 502b separated. Next, a discussion is provided to explain how the first path in the SVG file is used to draw the vector object 502a:

| | |
|---|---|
| fill = "#00015F" | Fill the shape with this color. |
| d= | Start the path here. |
| M0, 0 | Move to 0, 0, meaning start to draw from this coordinate (e.g., put the "pen" here) |
| L100, 0 | Line to (absolute) 100, 0, meaning draw a line to coordinate x, y = 100, 0 (from previous point). |
| L150, 50 | Line to (absolute) 150, 50, meaning draw a line to coordinate x, y = 150, 50 (from previous point). |
| L100, 100 | Line to (absolute) 100, 100, meaning draw a line to coordinate x, y = 100, 100 (from previous point). |
| L0, 100 | Line to (absolute) 0, 100, meaning draw a line to coordinate x, y = 0, 100 (from previous point). |
| z | Close the shape, which is the same as drawing a line from the last point to the end point. |

Note: SVG enables one to describe paths in several ways, e.g. using "l" or "L" which means "line to" in both cases but in the first case it is relevant (from previous drawing point) and in the second case it is definite (to a fixed coordinate). Plus, one can use "C" which means to "curve to" the next coordinate, using a Bezier curve.

Thus, when method 300 compares the two paths within the SVG file it sees that the part "L100, 0L150, 50L100, 100" is the same in both paths. This is how method 300 can identify a common complex edge 504 which is shared by two vector objects 502a and 502b (step 302). Note: in SVG the order in which the paths are drawn might be reversed meaning it is possible to travel the same path but in different directions, this means the method 300 should also compare the reversed paths in the SVG file to discover the common edges. In either case, the method 300 compares the description of the paths and decides if they are actually the same which indicates a common edge between adjacent vector objects.

Figure 5C:
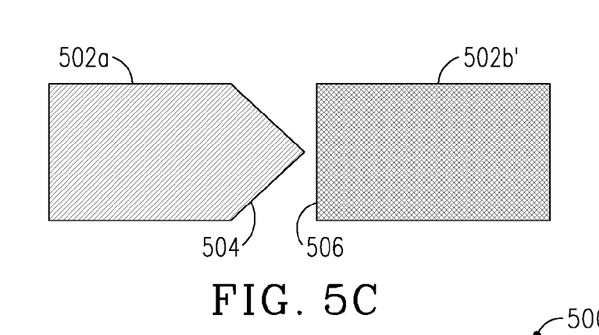

The method 300 uses this knowledge to simplify the vector image 500 by replacing the complex edge 504 associated with one of the vector objects (e.g., vector object 502b) with a simplified edge 506 (step 306). The vector object 502b can be simplified in the SVG file as follows:

```
<?xml version="1.0" encoding="utf-8"?>
<svg width="400" height="400">
<path fill="#FF0100" d="M200, 0L100, 0L100, 100L200, 100z"/>
<path fill="#00015F" d="M0, 0L100, 0L150, 50L100, 100L0, 100z"/>
</svg>
```

Figure 5D:
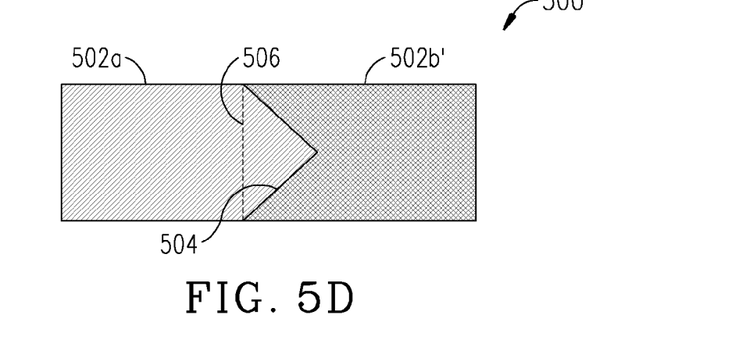

As shown in FIG. 5C, the method 300 has simplified the two lines in the complex edge 504 associated with vector object 502b by replacing them with one vertical line 506 from x, y=100,0 to x, y=100,100. In addition, the method 300 has changed the drawing order of the two vector objects 502a and 502b' such that the unchanged vector object 502a is now drawn on top of the changed vector object 502b' in order to form the compressed vector image 500' (step 308) (see FIG. 5D). As a result, the method 300 reduced the amount of information which was needed to form the compressed vector image 500'. As can be seen, the compressed vector image 500' has the same visual representation as the non-compressed vector image 500 (compare FIGS. 5A and 5D). In this example, the method 300 enabled a gain of 7 characters (L150,50) out of 198, which is approximately a 3.5% gain in size. In fact, the more complex the shared edge, then the more the method 300 can gain by simplifying that shared edge with a theoretical maximum gain approaching 50%. This is desirable because the method 300 by simplifying a shared edge in effect reduces the amount of information needed to describe the associated vector object.

Figure 6A:
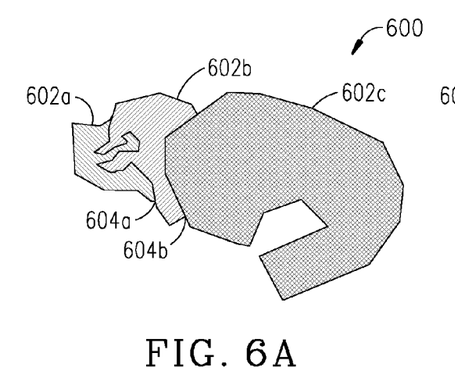
FIGS. 6A-6E is a set of drawings which are used to help explain how a third vector-based image can be compressed by the method shown in FIG. 3 in accordance with the present invention.
Figure 6B:
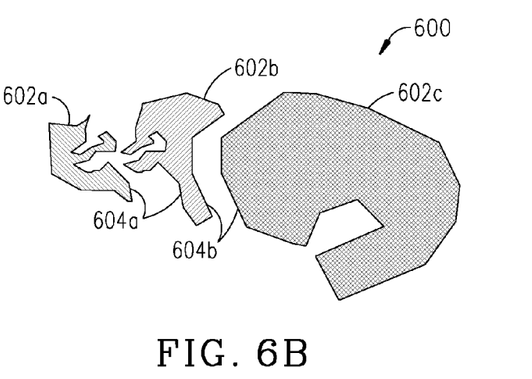
Figure 6C:
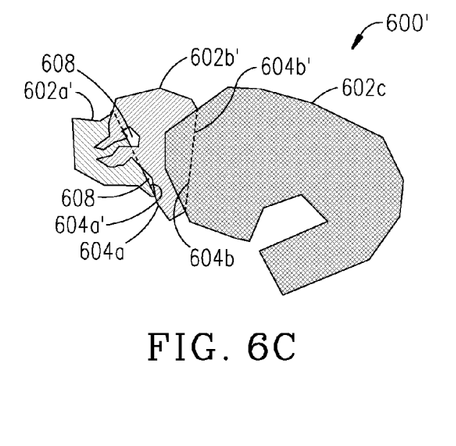

In example #3, the method 300 compresses the vector-based image 600 shown in FIG. 6A. The three vector objects 602a, 602b and 602c which make-up the vector-based image 600 are shown separated from one another in FIG. 6B. As can be seen, the vector objects 602a and 602b share a complex edge 604a and vector objects 602b and 602c share a complex edge 604b. Assume, the method 300 simplified the two complex edges 604a and 604b and created two simplified edges 604a' and 604b' which are part of the simplified vector image 600' shown in FIG. 6C. If this happened, the simplified edge 604a' would be too small because there would be a space 608 between the simplified vector objects 602a' and 602b'. Of course, the method 300 would not do this however the defective simplified edge 604a' was created to illustrate a point that a simplified edge needs to be completely hidden underneath one or more vector objects.

Figure 6D:
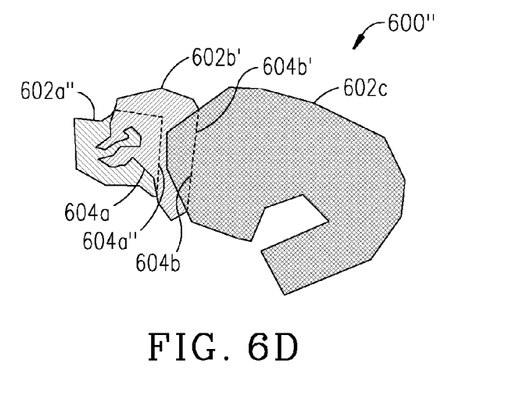
Figure 6E:
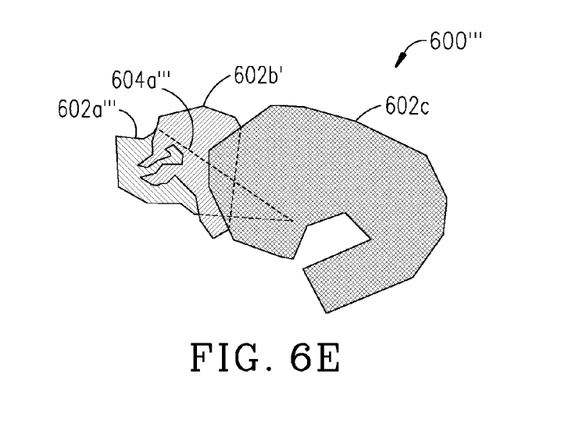

In practice, the method 300 would simplify the two complex edges 604a and 604b and possibly create simplified edges 604a" and 604b' respectively associated with changed vector objects 602a" and 602b' to form the simplified vector image 600" shown in FIG. 6D. Now, it can be seen that the simplified edge 604a" associated with changed vector object 602a" is completely hidden under the simplified vector object 602b' (compare FIGS. 6C and 6D). This all works fine. However, the method 300 could also have logic that knows when one can draw another vector object in this case vector object 602c on top of the other two vector objects 602a and 602b. Then, the method 300 can use that information to simplify the simplified edge 604a" even further so as to create the simplified edge 604a'" shown in FIG. 6E. This particular simplified edge 604a'" is a bit of a construction but it helps illustrate a point that if desired one could simplify an edge so it would be hidden under multiple vector objects. In either case, the visual appearances of the simplified vector images 600" and 600'" are the same as the visual appearance of the non-simplified vector image 600 (compare FIGS. 6A, 6D and 6E). But, the simplified vector objects 602a", 602a'" and 602b' require less data to form them when compared to the data needed to form the unchanged vector objects 602a and 602b which are associated with the non-simplified vector image 600.

Figure 7A:
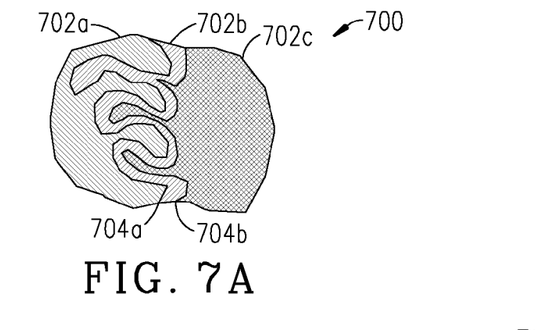
FIGS. 7A-7D is a set of drawings which are used to help explain how a fourth vector-based image can be compressed by the method shown in FIG. 3 in accordance with the present invention.
Figure 7B:
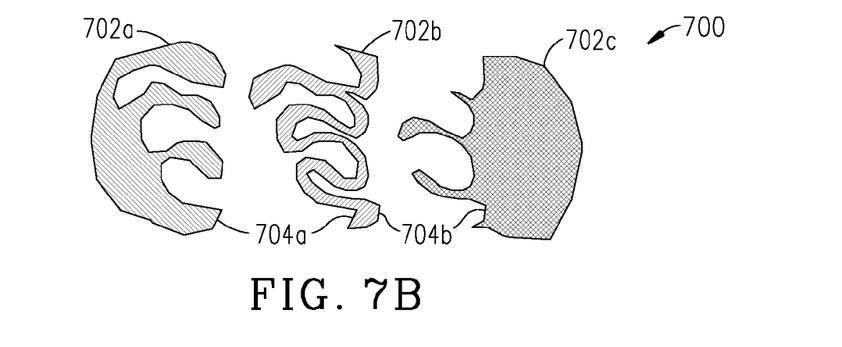
Figure 7C:
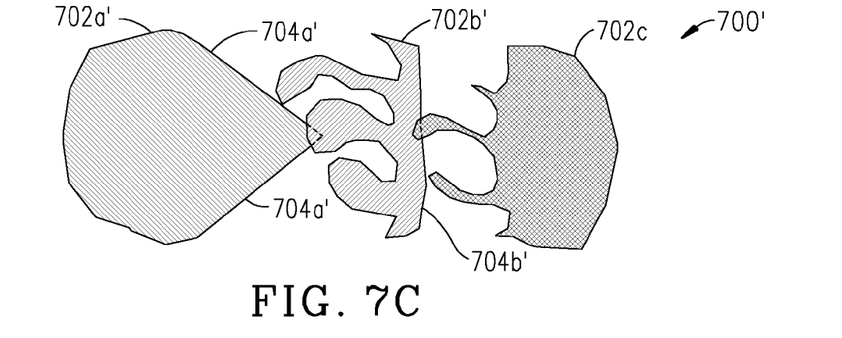
Figure 7D:
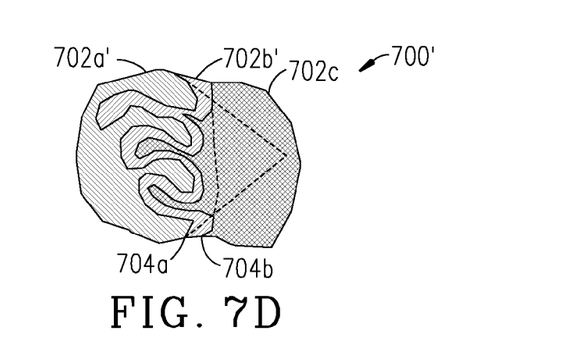

In example #4, the method 300 compresses the vector-based image 700 shown in FIG. 7A. The three vector objects 702a, 702b and 702c which make-up the vector-based image 700 are shown separated from one another in FIG. 7B. As can be seen, the two vector objects 702a and 702b share a complex edge 704a and the two vector objects 702b and 702c share a complex edge 704b. The method 300 could simplify these two complex edges 704a and 704b by creating two simplified edges 704a' and 704b' which are respectively associated with the changed vector objects 702a' and 702b' (see FIG. 7C). Then, the method 300 could draw the unchanged vector object 702c on top of the changed vector object 702b' which was drawn on top of the changed vector object 702a' to form a simplified vector image 700' (see FIG. 7D). As can be seen, the simplified edge 704a' of the changed vector object 702a' is completely hidden under two different vector objects 702b' and 702c. And, the simplified edge 704b' of the changed vector object 702b is completely hidden under one vector object 702c. After this simplification, the visual appearance of the simplified vector image 700' remains the same as the visual appearance of the non-simplified vector image 700 (compare FIGS. 7A and 7D).

From the foregoing, it should be appreciated that a basic idea of method 300 is that a complex edge shared between two vector objects is simplified to have one complex shape and one simplified edge. The simplified edge can be created by using lines, curves or any other shapes that are simpler than the original complex edge. Here simpler means that it can be defined using less information. The method 300 also draws the unchanged vector object which has the complex edge on top of the changed vector object which has the simplified edge. The drawing order can be controlled by using a depth buffer which specifies what vector object is to be drawn on top of another. This drawing order concept is also known as the "painters model". Simply described it means that what is painted last is what is seen. If for example, a picture is painted on the screen and then a red circle is painted on top of it, then one will not see the part of the picture underneath the red circle. Because of this drawing order, the method 300 works well with oblique (non-transparent) adjacent vector objects but it does not work with "see-through" vector objects. Lastly, the method 300 as described above effectively provides for a more compact representation of a vector-based image than was output by a vectorization program. However, the method 300 could also be used as part of the vectorization program itself meaning that the enhanced vectorization program would immediately create and output the compressed vector-based image.

Figure 8:
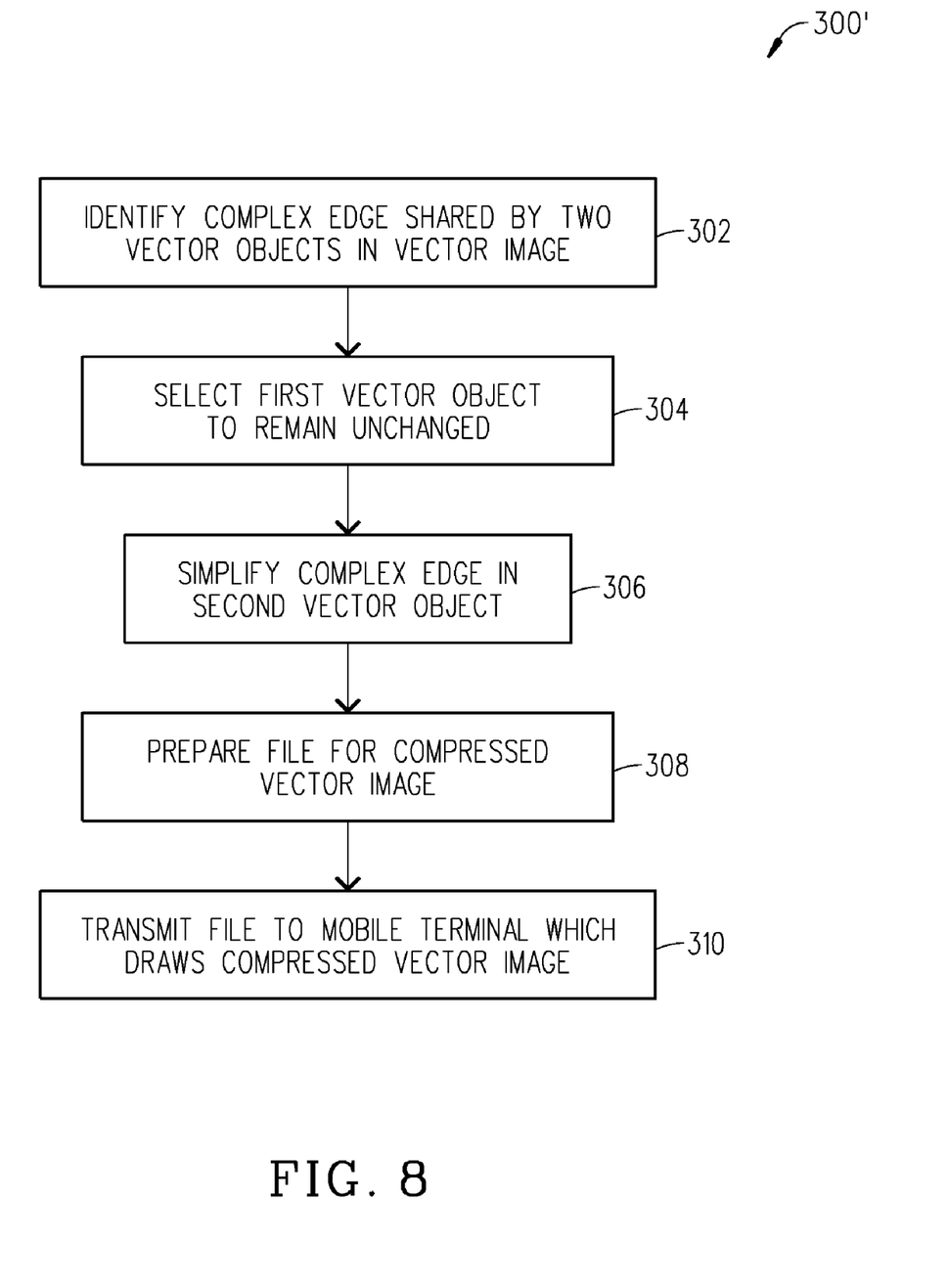
FIG. 8 is a flowchart illustrating the basic steps of a method for compressing a vector-based image which is transmitted to a mobile terminal in accordance with the present invention.

In one application, the present invention can be used to create smaller files to be sent to a mobile terminal (e.g., mobile phone, PDA, laptop computer) which satisfies an important goal of the mobile community. In this case, the enhanced method 300' would have the following steps: (1) identify a complex edge that is shared by two adjacent vector objects which are part of a vector-based image (step 302 in FIG. 8); (2) select one of the vector objects (e.g., first vector object) which will have an unchanged complex edge when it is later used to form a compressed vector-based image (step 304 in FIG. 8); (3) simplify the complex edge of the other vector object (e.g., second vector object) (step 306 in FIG. 8); (4) use a scalable vector graphics language (e.g., SVG, SVG Basic (SVGB), SVG Tiny (SVGT)) to prepare a file which indicates that the simplified edge of the changed vector object (e.g., simplified second vector object) is to be drawn so as to be completely hidden underneath the unchanged vector object (e.g., unchanged first vector object) or is to be drawn so as to be completely hidden underneath the unchanged vector object (e.g., unchanged first vector object) and at least one more additional vector object (step 308 in FIG. 8); and (5) transmit the file to the mobile terminal which then draws/forms the compressed vector-based image (step 310 in FIG. 8). Note: SVGT is a format which was included in the 3GPP release 5 and 6 for Personal Shopping System (PSS) and Multimedia Messaging Service (MMS) (see 3GPP PSS Release 5 & 6 (3GPP TS 26.234 v5.7.0 & 3GPP TS 26.234 v.6.7.0) and 3GPP MMS Release 5 & 6 (3GPP TS 26.140 v5.2.0 & 3GPP TS 26.140 v.6.3.0)).

Although one embodiment of the present invention has been illustrated in the accompanying Drawings and described in the foregoing Detailed Description, it should be understood that the invention is not limited to the disclosed embodiment, but is also capable of numerous rearrangements, modifications and substitutions without departing from the spirit of the invention as set forth and defined by the following claims.

The invention claimed is:

1. A method for compressing a vector-based image, said method comprising the steps of:
   identifying a complex edge that is shared by a first vector object and a second vector object both of which are adjacent to one another and both of which are a part of the vector-based image;
   selecting the first vector object which is going to have an unchanged complex edge when used to form a compressed vector-based image;
   simplifying the complex edge of the second vector object; and
   drawing the first vector object on top of at least a portion of the simplified edge of the second vector object to form the compressed vector-based image.

2. The method of claim 1, wherein said identifying step further includes comparing a first object path of the first vector object to a second object path of the second vector object so as to identify the complex edge that is shared by the first vector object and the second vector object.

3. The method of claim 1, wherein said selecting step further includes randomly selecting the first vector object which is going to have the unchanged complex edge when used to form the compressed vector-based image.

4. The method of claim 1, wherein said selecting step further includes iteratively/intelligently selecting the first vector object which is going to have the unchanged complex edge when used to form the compressed vector-based image.

5. The method of claim 1, wherein said simplifying step further includes calculating a simple shape to be used to replace the complex edge of the second vector object such that during said drawing step the simplified edge of the second vector object is drawn to be hidden underneath the first vector object or is drawn to be hidden underneath the first vector object and at least one more additional vector object to form the compressed vector-based image.

6. The method of claim 1, wherein said drawing step further includes using a scalable vector graphics language to indicate that the first vector object is to be drawn on top of at least a portion of the simplified edge of the second vector object to form the compressed vector-based image.

7. The method of claim 1, wherein said first vector object is not a see-through vector object and is not surrounded by said second vector object.

8. The method of claim 1, wherein said second vector object is not a see-through vector object and is not surrounded by said first vector object.

9. An image processing device, comprising:
   a processor; and
   a memory with instructions stored therein which are accessible and processable by said processor to facilitate the compression of a vector-based image by:
   identifying a complex edge that is shared by a first vector object and a second vector object both of which are adjacent to one another and both of which are a part of the vector-based image;
   selecting the first vector object which is going to have an unchanged complex edge when used to form a compressed vector-based image;
   simplifying the complex edge of the second vector object; and
   drawing the first vector object on top of at least a portion of the simplified edge of the second vector object to form the compressed vector-based image.

10. The image processing device of claim 9, wherein said processor facilitates the identifying step by comparing a first object path of the first vector object to a second object path of the second vector object so as to identify the complex edge that is shared by the first vector object and the second vector object.

11. The image processing device of claim 9, wherein said processor facilitates the selecting step by randomly selecting the first vector object which is going to have an unchanged complex edge when used to form a compressed vector-based image.

12. The image processing device of claim 9, wherein said processor facilitates the selecting step by iteratively/intelligently selecting the first vector object which is going to have an unchanged complex edge when used to form a compressed vector-based image.

13. The image processing device of claim 9, wherein said processor facilitates the simplifying step by calculating a simple shape to be used to replace the complex edge of the second vector object such that during said drawing step the simplified edge of the second vector object is drawn to be hidden underneath the first vector object or is drawn to be hidden underneath the first vector object and at least one more additional vector object to form the compressed vector-based image.

14. The image processing device of claim 9, wherein said processor facilitates the drawing step by using a scalable vector graphics language to indicate that the first vector object is to be drawn on top of at least a portion of the simplified edge of the second vector object to form the compressed vector-based image.

15. The image processing device of claim 9, wherein said first vector object is not a see-through vector object and is not surrounded by said second vector object.

16. The image processing device of claim 9, wherein said second vector object is not a see-through vector object and is not surrounded by said first vector object.

17. A method for compressing a vector-based image which is transmitted to a mobile terminal, said method comprising the steps of:
   (a) identifying a complex edge that is shared by a first vector object and a second vector object both of which are adjacent to one another and both of which are a part of the vector-based image, wherein said identifying step further includes:
      (a1) comparing a first object path of the first vector object to a second object path of the second vector object to identify the complex edge that is shared by the first vector object and the second vector object within said vector-based image;
   (b) selecting the first vector object which is going to have an unchanged complex edge when used to form a compressed vector-based image;
   (c) simplifying the complex edge of the second vector object, wherein said simplifying step further includes:
      (c1) calculating a simple shape to be used to replace the complex edge of the second vector object;
   (d) using a scalable vector graphics language to prepare a file which indicates that the simplified edge of the second vector object is to be drawn so as to be hidden underneath the first vector object or is to be drawn so as to be hidden underneath the first vector object and at least one more additional vector object; and (e) transmitting the file to said mobile terminal which then draws the simplified edge of the second vector object to be hidden underneath the first vector object or draws the simplified edge of the second vector object to be hidden underneath the first vector object and at least one more additional vector object so as to form the compressed vector-based image.

18. The method of claim 17, wherein said selecting step further includes randomly selecting the first vector object which is going to have the unchanged complex edge when used to form the compressed vector-based image.

19. The method of claim 17, wherein said selecting step further includes iteratively/intelligently selecting the first vector object which is going to have the unchanged complex edge when used to form the compressed vector-based image.

20. The method of claim 17, wherein said first vector object is not a see-through vector object and is not surrounded by said second vector object.

21. The method of claim 17, wherein said second vector object is not a see-through vector object and is not surrounded by said first vector object.

\* \* \* \* \*